(12) United States Patent
Di Fiore et al.

(10) Patent No.: US 12,201,894 B2
(45) Date of Patent: Jan. 21, 2025

(54) MOUSE AND GAMING SYSTEM

(71) Applicant: ADATA TECHNOLOGY CO., LTD., New Taipei (TW)

(72) Inventors: Luca Di Fiore, New Taipei (TW); Shao-Wen Hsu, Taipei (TW); Shun-Wen Chan, Taipei (TW)

(73) Assignee: ADATA TECHNOLOGY CO., LTD., New Taipei (TW)

( * ) Notice: Subject to any disclaimer, the term of this patent is extended or adjusted under 35 U.S.C. 154(b) by 281 days.

(21) Appl. No.: 18/085,010

(22) Filed: Dec. 20, 2022

(65) Prior Publication Data
US 2023/0398436 A1  Dec. 14, 2023

(30) Foreign Application Priority Data
Jun. 10, 2022  (TW) .................................. 111121546

(51) Int. Cl.
| | |
|---|---|
| *A63F 13/22* | (2014.01) |
| *A63F 13/23* | (2014.01) |
| *A63F 13/24* | (2014.01) |
| *A63F 13/77* | (2014.01) |
| *A63F 13/79* | (2014.01) |
| *G06F 3/0354* | (2013.01) |

(52) U.S. Cl.
CPC .............. *A63F 13/22* (2014.09); *A63F 13/23* (2014.09); *A63F 13/24* (2014.09); *A63F 13/77* (2014.09); *A63F 13/79* (2014.09); *G06F 3/03543* (2013.01)

(58) Field of Classification Search
CPC .......... A63F 13/20; A63F 13/22; A63F 13/23; A63F 13/24; A63F 13/79; A63F 2300/208; A63F 2300/1018; G06F 3/03543; G06F 3/038; G06F 3/0383; G06F 3/039
See application file for complete search history.

(56) References Cited

U.S. PATENT DOCUMENTS

| | | | |
|---|---|---|---|
| 6,924,787 B2 * | 8/2005 | Kramer ................... | G06F 3/016 715/702 |
| 9,317,138 B1 * | 4/2016 | Wright .................. | G06F 3/0346 |
| 9,573,056 B2 * | 2/2017 | Marks ..................... | A63F 13/20 |

(Continued)

FOREIGN PATENT DOCUMENTS

| | | |
|---|---|---|
| CN | 113577782 A | 11/2021 |
| TW | 200743519 A | 12/2007 |

*Primary Examiner* — William H McCulloch, Jr.
(74) *Attorney, Agent, or Firm* — Li & Cai Intellectual Property (USA) Office

(57) ABSTRACT

A mouse and a gaming system are respectively provided. The gaming system includes a mouse and an intermediate application program. The mouse includes an operation module, a solid-state disk (SSD), and a processing module. The processing module is connected to an electronic device. When the electronic device runs a game, the processing module records an operation signal generated by an operation of a user in the SSD. The processing module can store settings made by the user to the game and to the mouse in the SSD. When the game is ended in the electronic device, the processing module stores a game result information in the SSD. When the electronic device runs the same game and the same mouse is used to play the same game, the user can read the settings in the SSD to quickly perform the same settings on the game and the mouse.

11 Claims, 5 Drawing Sheets

(56) References Cited

U.S. PATENT DOCUMENTS

| | | | |
|---|---|---|---|
| 11,128,636 B1* | 9/2021 | Jorasch | ............... G06F 3/0346 |
| 11,366,531 B2* | 6/2022 | Jorasch | ............. G06F 3/03543 |
| 11,809,642 B2* | 11/2023 | Jorasch | ................. G06F 3/016 |
| 12,008,174 B2* | 6/2024 | Jorasch | .................. G06F 21/32 |
| 2009/0298590 A1* | 12/2009 | Marks | ................ A63F 13/245 |
| | | | 463/37 |
| 2014/0049461 A1 | 2/2014 | Shen | |
| 2017/0087455 A1* | 3/2017 | Black | .................... A63F 13/44 |
| 2017/0153702 A1* | 6/2017 | Abrahams | .............. G06F 16/29 |
| 2018/0210569 A1* | 7/2018 | Masson | ............... G06F 3/0346 |
| 2022/0118678 A1* | 4/2022 | Di Fiore | .................... C08J 3/09 |
| 2023/0398436 A1* | 12/2023 | Di Fiore | ............. G06F 3/0383 |

\* cited by examiner

MOUSE AND GAMING SYSTEM

CROSS-REFERENCE TO RELATED PATENT APPLICATION

This application claims the benefit of priority to Taiwan Patent Application No. 111121546, filed on Jun. 10, 2022. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a mouse and a gaming system, and more particularly to a mouse including a solid-state disk (SSD) and a gaming system including the mouse.

BACKGROUND OF THE DISCLOSURE

For an e-sports player pursuing optimal gaming experience at different venues, a lot of time needs to be spent on setting a resolution of a screen, buttons of a mouse, and sensitivity of the mouse, thereby causing trouble for the player.

In the related art, some games enable the player to save game-related settings online. However, these games cannot reflect settings configured by a player on a screen and a mouse. When the player plays a game at a different venue, relevant adjustments to the settings still need to be made for the screen and the mouse at that venue based on experience and memory of the player.

SUMMARY OF THE DISCLOSURE

In response to the above-referenced technical inadequacies, the present disclosure provides a mouse and a gaming system for improving the technical inadequacy that a player pursuing a game experience must spend a lot of time to configure relevant settings before playing a game in a different venue.

In one aspect, the present disclosure provides a mouse. The mouse includes an operation module, a solid-state disk, and a processing module. The operation module is configured to generate an operation signal corresponding to an operation of the mouse by a user. The processing module is electrically connected to the operation module and the solid-state disk. The processing module is capable of being connected to an electronic device in a wired or a wireless manner, and data in the solid-state disk is able to be accessed by the electronic device. When the electronic device that is connected to the processing module runs a game, the processing module receives game information, a round start signal and a round end signal that are transmitted by the electronic device. When the processing module receives the game information and the round start signal successively, the processing module transmits the operation signal generated by the operation module in real time to the electronic device, and the processing module synchronously records the operation signal in an operation record file in a preset folder of the solid-state disk. When the processing module receives the round end signal, the processing module stops recording the operation signal generated by the operation module in the operation record file. The processing module further stores a setting file in the preset folder. The setting file includes the game information and a mouse setting information. The game information includes a game basic data and a game setting database. The game setting database includes at least one of a game screen resolution, a game button setting data and a game mouse sensitivity. The mouse setting information includes at least one of a sensitivity data, a button setting data, a mouse return rate and a response rate at a time when the round start signal is received by the mouse. After the processing module receives the round end signal, the processing module further stores game result information transmitted by the electronic device in the preset folder. The game result information includes a game winning or losing data and multiple pieces of real-time status data. The multiple pieces of real-time status data record results of the game that are correspondingly generated according to multiple ones of the operation signal.

In another aspect, the present disclosure provides a gaming system. The gaming system includes a mouse and an intermediate application program. The mouse includes an operation module, a solid-state disk, and a processing module. The operation module is configured to generate an operation signal corresponding to an operation of the mouse by a user. The processing module is electrically connected to the operation module and the solid-state disk. The processing module is capable of being connected to an electronic device in a wired or a wireless manner. The intermediate application program is capable of running on an operating system of the electronic device. The intermediate application program is capable of obtaining a running state of the operating system through a system application programming interface of the operating system to confirm whether or not the operating system is currently running a game. When the intermediate application program confirms that the operating system is currently running the game, the intermediate application program obtains game information from a game application programming interface of the game and transmits the game information to the mouse. Further, the intermediate application program obtains the running state of the game through the game application programming interface to confirm whether or not the game is currently starting a new game round, ending a game round, or not starting a game round. When the intermediate application program confirms that the game is starting the new game round, the intermediate application program transmits a round start signal to the mouse. When the processing module receives the round start signal, the processing module transmits the operation signal generated by the operation module in real time to the electronic device, and the processing module further synchronously records the operation signal in an operation record file in a preset folder of the solid-state disk. The processing module also stores a setting file in the preset folder. The setting file includes the game information and a mouse setting information. The game information includes a game basic data and a game setting database. The game setting database includes at least one of a game screen resolution, a game button setting data and a game mouse sensitivity. The mouse setting information includes at least one of a sensitivity data, a button setting data, a mouse return rate and a response rate at a time when the mouse receives the round start signal. When the intermediate application program confirms that the game is ending the game round through the game application programming interface, the intermediate application program transmits a round end signal and a game result information to the mouse. When the processing module receives the round end signal, the processing module stops recording the operation signal generated by the operation module in the operation record file, and the processing module further stores the game result information in the preset folder. The game result information includes a game winning or losing data and multiple pieces of real-time status data. The multiple pieces of real-time status data record results of the game that are correspondingly generated according to multiple ones of the operation signal.

Therefore, by the designs of the processing module, the operation module, and the solid-state disk, the mouse and the gaming system of the present disclosure can store relevant settings of a user in different games in the solid-state disk of the mouse. Therefore, when the user plays a game in a different venue, the user can easily and quickly complete the relevant settings by reading the relevant files in the solid-state disk in the mouse.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
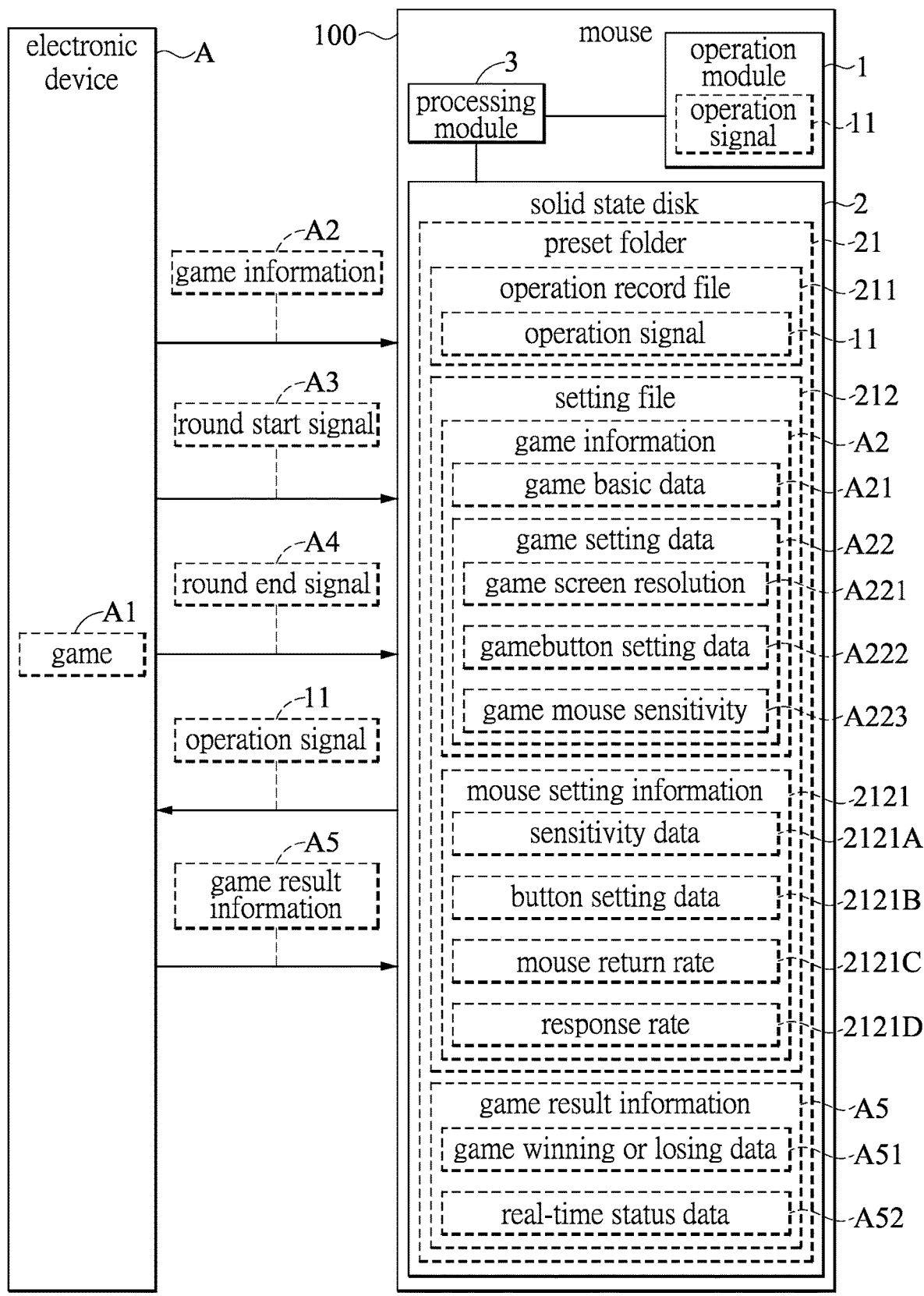
FIG. 1 is a functional block diagram of a mouse according to a first embodiment the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

FIG. 1 is a functional block diagram of a mouse according to a first embodiment the present disclosure. A mouse 100 of the present disclosure includes an operation module 1, a solid-state disk (SSD) 2, and a processing module 3. The operation module 1 is used for generating an operation signal 11 corresponding to an operation of the mouse 100 by a user. After an electronic device A that is connected to the mouse 100 receives the operation signal 11, an operating system of the electronic device A performs a corresponding action For example, if the user holds and moves the mouse 100, a cursor on a screen of the electronic device A connected to the mouse 100 will move correspondingly. When the user presses a button of the mouse 100, a surrounding of the cursor on the screen of the electronic device A can be changed accordingly (e.g., a folder is clicked and accessed, or a menu appears next to the cursor).

The solid-state disk 2 is mounted in a housing of the mouse 100. Relevant specifications (i.e., capacity and interface) of the solid-state disk 2 can be changed according to requirements, and the present disclosure is not limited thereto. In addition, the solid-state disk 2 can be a circuit board that is detachably or non-detachably mounted in the housing of the mouse 100 according to the requirements.

The processing module 3 is electrically connected to the operation module 1 and the solid-state disk 2. The processing module 3 can be connected to an electronic device A (i.e., a computer, a laptop computer, or a tablet computer) in a wired or wireless manner. For example, the mouse 100 can include a USB TYPE-C connector, and the mouse 100 can be connected to the electronic device A through the USB TYPE-C connector and a corresponding connecting cable. Accordingly, the electronic device A can receive the operation signal 11 transmitted by the operation module 1 through the processing module 3, and the electronic device A can accordingly access the data in the solid-state disk 2. In other embodiments of the present disclosure, the mouse 100 can also be connected to the electronic device A by using a wireless connection manner such as BLUETOOTH® or WI-FI®, and accordingly transmits relevant signals and data with the electronic device A.

When the electronic device A connected to the processing module 3 runs a game A1, the processing module 3 can receive a game information A2, a round start signal A3, and a round end signal A4 that are transmitted by the electronic device A. In practical applications, the processing module 3 can receive the game information A2, the round start signal A3, and the round end signal A4 that are transmitted by the electronic device A in a wired or wireless manner.

It should be noted that, in one application, the processing module 3 can, for example, include both a wireless connection chip and a wired connection chip. The processing module 3 can, for example, transmit the operation signal 11 with the electronic device A in a wireless manner. In addition, the processing module 3 can, for example, further receive the game information A2, the round start signal A3, and the round end signal A4 transmitted by the electronic device A in a wired manner. Alternatively, the processing module 3 can transmit the operation signal 11 to the electronic device A, and simultaneously receive the game information A2, the round start signal A3, and the round end signal A4 transmitted by the electronic device A in a wired or wireless manner.

In practical applications, after the processing module 3 is connected to the electronic device A, the processing module 3 can, for example, send a query signal to the electronic device A at a predetermined interval to obtain a current operating status of the electronic device A. When the processing module 3 confirms that the electronic device A is currently running the game A1, the processing module 3 can send another signal to obtain the game information A2 from the electronic device A. Similarly, after the processing module 3 receives the game information A2, the processing module 3 can send another query signal to the electronic device A at another predetermined time interval, so that when the game A1 run by the electronic device A is starting a new game round, the processing module 3 can obtain the round start signal A3. Further, when the game round of the game A1 run by the electronic device A is ended, the processing module 3 can obtain the round end signal A4. The game round that is referred to herein refers to, for example, a battle in a game.

In another embodiment of the present disclosure, the electronic device A can also actively send the game information A2 to the mouse 100 when the game A1 starts running When the game round of the game A1 is started, and when the game round of the game A1 is ended, the electronic device A can actively transmit the round start signal A3 and the round end signal A4 to the mouse 100, respectively. Specifically, the electronic device A can have an intermediate application program (to be described in further detail hereinafter) installed therein, and an intermediate application program 200 will actively transmit the game information A2, the round start signal A3, and the round end signal A4 to the mouse 100.

According to the above, a manner in which the mouse 100 obtains the game information A2, the round start signal A3, and the round end signal A4 from the electronic device A can be achieved by the mouse 100 actively querying the electronic device A, or by the electronic device A actively transmitting to the mouse 100 in a corresponding state.

When the processing module 3 receives the game information A2 and the round start signal A3 in succession, the processing module 3 transmits the operation signal 11 generated by the operation module 1 to the electronic device A. In addition, the processing module 3 synchronously records the operation signal 11 in an operation record file 211 of a preset folder 21 of the solid-state disk 2. When the processing module 3 receives the round end signal A4, the processing module 3 stops the action of recording the operation signal 11 generated by the operation module 1 in the operation record file 211. That is, after the processing module 3 receives the round start signal A3 transmitted by the electronic device A, the processing module 3 starts to record all operations performed by the user on the mouse 100 in the operation record file 211 of the preset folder 21 of the solid-state disk 2. When the user ends the game round of the game, the processing module 3 stops recording the operation signal 11 in the solid-state disk 2.

In practical applications, the processing module 3 also stores a setting file 212 in the preset folder 21. The setting file 212 includes the game information A2 and a mouse setting information 2121. The game information A2 includes a game basic data A21 and a game setting database A22. The game basic data A21 can include, for example, a game name, a game start date, and a game start time. The game setting database A22 can include, for example, a game screen resolution A221, a game button setting data A222, and a game mouse sensitivity A223. The game screen resolution A221 refers to a setting value of a resolution of a game screen performed by a user in a relevant setting interface of the game A1. The game button setting data A222 refers to a setting data of relevant operational buttons of the game A1 by the user in a relevant setting interface of the game A1, such as the functions represented by specific buttons of a keyboard in the game A1, or the functions represented by specific buttons of the mouse 100 in the game A1. The game mouse sensitivity A223 refers to a setting value of a sensitivity of the mouse 100 in the game A1 by the user in a relevant setting interface of the game A1.

The mouse setting information 2121 includes at least one of a sensitivity data 2121A, a button setting data 2121B, a mouse return rate (such as a report rate or a polling rate) 2121C, and a response rate 2121D at a time when the round start signal A3 is received by the processing module 3 of the mouse 100. The sensitivity data 2121A and the button setting data 2121B respectively refer to the information regarding the sensitivity (such as dots per inch, DPI) of the mouse 100 and the setting of each button of the mouse 100 by the user using the relevant setting interface corresponding to the mouse 100 on the electronic device A. In one embodiment of the present disclosure, the mouse return rate/response rate can be, for example, 500 Hz/2 ms, 1000 Hz/1 ms, or the like.

That is, when the processing module 3 receives the game information A2, the processing module 3 stores relevant information (i.e., the game basic data A21, the game screen resolution A221, the game button setting data A222, and the game mouse sensitivity A223) corresponding to the game A1 in the setting file 212 of the preset folder 21 of the solid-state disk 2. Furthermore, the processing module 3 further stores the relevant setting information (i.e., the sensitivity data 2121A, the button setting data 2121B, the mouse return rate 2121C, and the response rate 2121D) corresponding to the mouse 100 in the setting file 212 of the preset folder 21 in the solid-state disk 2.

It should be noted that, in the present embodiment, the game information A2 and the mouse setting information 2121 are stored in one setting file 212 as an example, but the present disclosure is not limited thereto. In different embodiments of the present disclosure, the game information A2 and the mouse setting information 2121 can be stored in two different setting files 212, that is, the preset folder 21 can store two setting files 212, in which one of the setting files 212 only stores the game information A2, and another one of the setting files 212 only stores the mouse setting information 2121. After the processing module 3 receives the round end signal A4, the processing module 3 can further store a game result information A5 transmitted by the electronic device A in the preset folder 21. The game result information A5 includes a game winning or losing data A51 and multiple pieces of real-time status data A52. The game winning or losing data A51 is used to represent a winning or losing result of a current game round of a user. The multiple pieces of real-time status data A52 is used to record results of the game A1 correspondingly generated according to multiple ones of the operation signal 11. Each piece of the real-time status data A52 can include, for example, a time data, a movement/key state of a mouse 100, and a game result. Each piece of the real-time status data A52 can be used to present a result of an operation of the user on the mouse 100 in the game A1. For example, one of the real-time status data A52 can indicate that the user clicks a right button of a mouse 100 at a certain point in time, which corresponds to completion of a sniping action in a game A1. In one embodiment, the multiple pieces of real-time status data A52 can be loaded by the game A1, and the game A1 can present a corresponding game screen according to the multiple pieces of real-time status data A52 for the user to view.

By virtue of the design that the processing module 3 can store the operation record file 211, the setting file 212, and the game result information A5 in the solid-state disk 2, the user can view the operation record file 211, the setting file 212, the game result information A5, and the related game screens after the game round ends, and the user can further review whether the various settings and operations of the game are appropriate. Specifically, for a professional e-sports player, the operation record file 211, the setting file 212, and the game result information A5 will effectively help the player to understand whether or not the game settings, mouse settings and various operations during the game have room for improvement.

In one specific embodiment, when the mouse 100 is connected to the electronic device A, the electronic device A can access the solid-state disk 2, and the user can view a plurality of preset folders 21 stored in the solid-state disk 2 through a relevant interface of the electronic device A. A folder name of each of the preset folders 21 includes, for example, a game name, and a date. Each of the preset folders 21 includes the operation record file 211 and the setting file 212. Furthermore, the user can move, copy, and paste the files stored in the solid-state disk 2 to the electronic device A through relevant operations.

It should be noted that, the data stored in each preset folder 21 corresponds to a single game. When the electronic device A runs different games A1, the mouse 100 uses different preset folders 21 in the solid-state disk 2 to store relevant data. That is, if the user uses the same mouse 100 to play a plurality of different games, the user will find a plurality of preset folders 21 when reading the solid-state disk 2. In different embodiments, a file name of each preset folder 21 can include a game name, a game date, and a game time. The data stored in the preset folder 21 can represent the relevant data corresponding to a single game round of a certain game being played by a user at a certain time on a certain date.

Accordingly, in the mouse 100 of the present disclosure, by including the operation module 1, the solid-state disk 2 and the processing module 3, the mouse 100 can record the relevant data of the settings performed by the user in the game A1 each time the user plays the game A1, and can also record the setting data of the user made to the mouse 100. In this way, afterwards, the user can quickly obtain relevant setting data of settings performed in previous games by accessing the solid-state disk 2.

In addition, the processing module 3 stores the relevant setting data in the corresponding preset folder 21 according to the game A1 that is currently running on the electronic device A. Therefore, the solid-state disk 2 stores a plurality of preset folders 21 according to different games A1, and the user does not need to memorize or record details of the settings that are made to the corresponding game A1.

Conventionally, a user may play different games at the same time, and the user may participate in competitions in different games. Furthermore, the user must record in-game settings corresponding to each of the games, relevant settings of the computer, and relevant settings of the mouse 100 by means of notes and the like. In this way, when the user arrives at a gaming venue, correct settings can be made to the computer, the game, and the mouse 100. Accordingly, on the day of competition, the user must make sure to bring relevant notes, otherwise correctly setting the computer, the game, and the mouse in the gaming venue will be difficult. If the user does not correctly set relevant devices of the gaming venue, various errors may be made during the competition due to settings being different.

The mouse 100 of the present disclosure includes the solid-state disk 2. In addition, the processing module 3 can automatically store relevant data in the solid-state disk 2 when the user plays the game A1. Therefore, the user does not need to memorize or record any of the settings in the game A1 and the settings of the mouse 100. When the user arrives at a gaming venue, the user only needs to carry the mouse 100 to easily and quickly complete relevant settings by reading the data in the solid-state disk 2.

Figure 2:
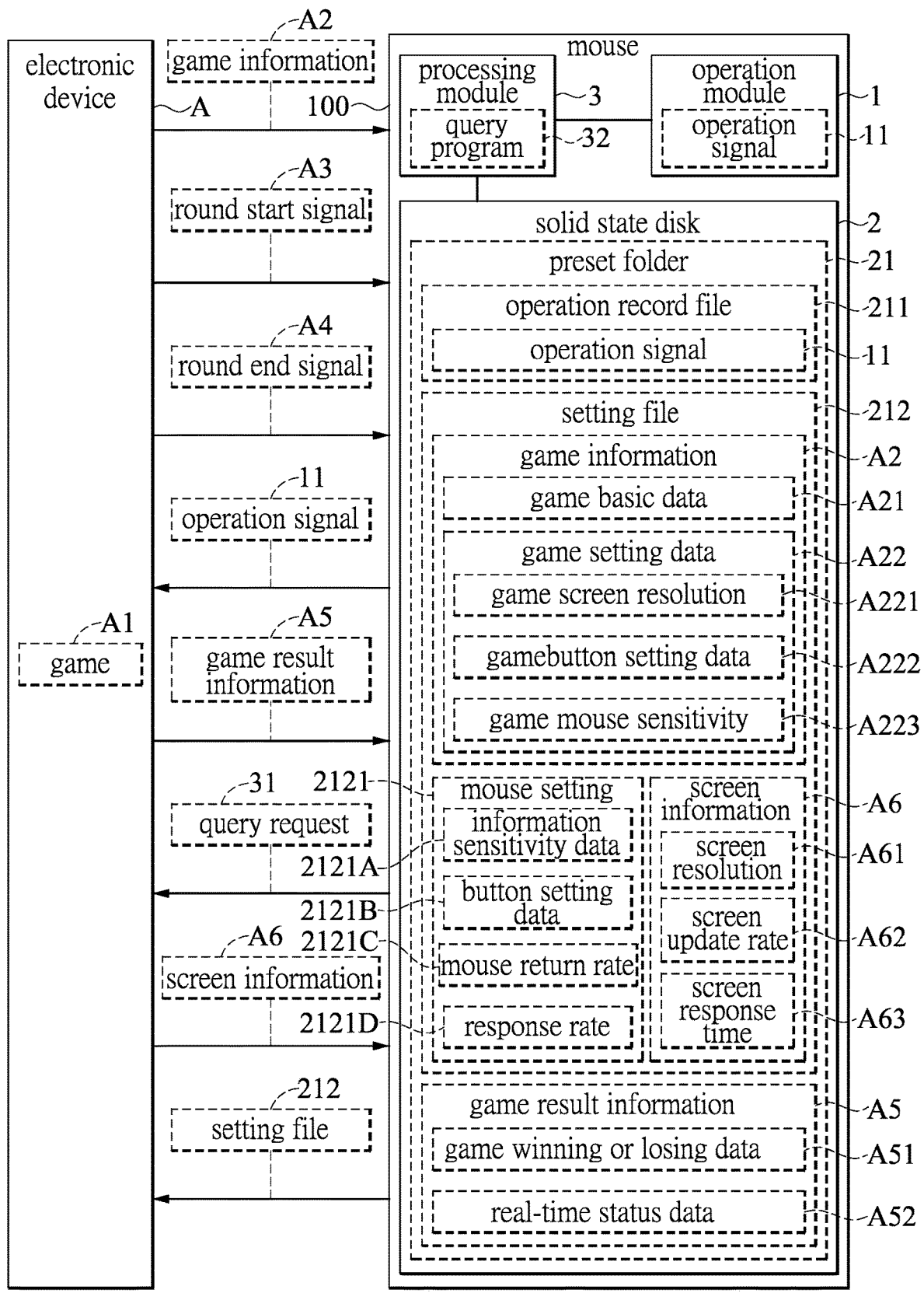
FIG. 2 is a functional block diagram of a mouse according to a second embodiment of the present disclosure.

Reference is made to FIG. 2, which is a functional block diagram of a mouse according to a second embodiment of the present disclosure. Differences between FIG. 2 (second embodiment) and FIG. 1 (first embodiment) will be described below. At least one of these differences can be applied to the aforementioned first embodiment to constitute one of the specific embodiments of the mouse 100 of the present disclosure.

One of the differences between the second embodiment and the first embodiment lies in that, the processing module 3 can send a query request 31 to the electronic device A to obtain a screen information A6 from the electronic device A. The screen information A6 includes at least one of a screen resolution A61, a screen refresh rate A62, and a screen response time A63. The processing module 3 can store the screen information A6 in the setting file 212. In practical applications, the processing module 3 can, for example, send the query request 31 to the electronic device to obtain the screen information A6 A when the processing module 3 receives the game information A2.

Accordingly, when the user uses the electronic device A to read the setting file 212 of the preset folder 21 of the solid-state disk 2, the user can clearly confirm details of the settings of the game A1, the screen, and the mouse 100 when the user previously played the game A1 that is currently running on the electronic device A. In this way, the above-mentioned design will help the user to quickly set the current electronic device A, the game A1, and the screen and the mouse 100 that are connected to the electronic device A. Another one of the differences between the second embodiment and the first embodiment is that, after the processing module 3 receives the game information A2, the processing module 3 can execute a query program 32, and query whether or not the same game basic data A21 is present in the solid-state disk 2 according to the game information A2 that is received. If the processing module 3 correspondingly finds the same game basic data A21 in the solid-state disk 2, the processing module 3 can adjust the mouse 100 according to the mouse setting information 2121 stored in the preset folder 21 that is found.

In other words, after the user connects the mouse 100 to the electronic device A that runs the game A1, if the user has previously used the same mouse 100 to play the same game A1, the mouse 100 will automatically adjust the current settings of the mouse 100 according to the settings that the user made on the mouse 100 when the user previously played the same game A1. In this way, when the user plays the same game A1, the settings are not required to be manually set.

In addition, in the query program 32, if the processing module 3 finds the same game basic data A21 in the solid-state disk 2, the processing module 3 can also transmit the setting file 212 stored in the found preset folder 21 to the electronic device A, so that the electronic device A can perform corresponding settings according to the game setting database A22.

That is, if the user has used the same mouse 100 to play the same game A1, then when the user brings the same mouse 100 to connect to an electronic device A in a different gaming venue to play the same game A1, the electronic device A receives the setting file 212 transmitted by the mouse 100, and the user can quickly complete the relevant settings for the electronic device A and the connected screen by viewing the setting file 212.

For example, when an e-sports player arrives at a different gaming venue, the e-sports player only needs to connect the mouse 100 to a computer (i.e., the electronic device A) in the gaming venue such that the e-sports player can view the setting file 212 transmitted by the mouse 100 to the computer, and the e-sports player can then use the setting file 212 to quickly perform settings to the computer.

It should be noted that, the above description is exemplified by the game information A2, the mouse setting information 2121, and the screen information A6 being stored in the same setting file 212, and the present disclosure is not limited thereto. In different embodiments, the game information A2, the screen information A6, and the mouse setting information 2121 can be stored in three different setting files 212. The setting file 212 that only stores the game information A2 is designed to be directly loaded by the game A1. The setting file 212 that only stores the screen information A6 is designed to be directly loaded by an operating system of the electronic device A. In addition, the setting file 212 that only stores the mouse setting information 2121 can be read by the processing module 3, such that corresponding settings can be directly performed on the mouse 100.

That is, after the e-sports player that brings the mouse 100 arrives at a gaming venue and connects the mouse 100 to the computer, the e-sports player can view the two setting files 212 transmitted by the mouse 100 on the computer. The e-sports player only needs to load the corresponding setting file 212 in a relevant setting interface of the game A1 and load the corresponding setting file 212 in a relevant setting interface in the operating system of the electronic device A to complete the in-game settings and the screen settings.

Figure 3:
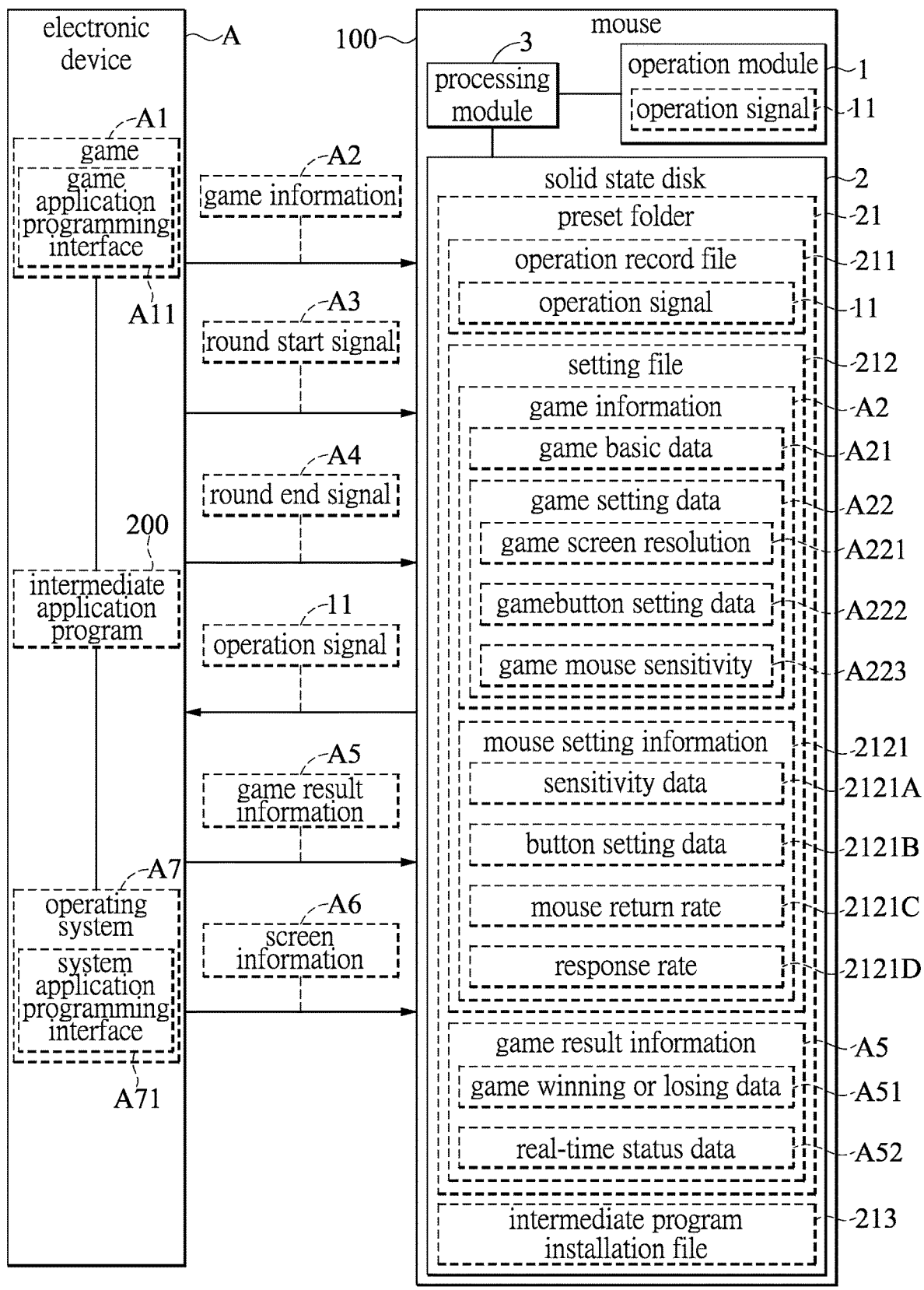
FIG. 3 is a functional block diagram of a mouse according to a third embodiment of the present disclosure.

Reference is made to FIG. 3, which is a functional block diagram of a mouse according to a third embodiment of the present disclosure. A major difference between FIG. 3 (third embodiment) and FIG. 1 (first embodiment) is that, the solid-state disk 2 further stores an intermediate program installation file 213 therein. The processing module 3 can transmit the intermediate program installation file 213 to the electronic device A, and an operating system A7 of the electronic device A can use the intermediate program installation file 213 to install an intermediate application program 200. In practical applications, the solid-state disk 2 can store a plurality of intermediate program installation files 213. Each of the intermediate program installation files 213 corresponds to one type of operating systems A7. For example, the solid-state disk 2 can store two intermediate program installation files 213. One of the intermediate program installation files 213 is used to install the corresponding intermediate application program 200 in an ANDROID™ operating system. Another one of the intermediate program installation files 213 is used to install the corresponding intermediate application program 200 in a WINDOWS® operating system.

The intermediate application program 200 can obtain a running state of the operating system A7 through a system application programming interface (API) A71 of the operating system A7 to confirm whether or not the operating system A7 is currently running a game A1. When the intermediate application program 200 confirms that the operating system A7 is currently running the game A1, the intermediate application program 200 will obtain the game information A2 from a game application programming interface A11 of the game A1 and transmit the game information A2 to the mouse 100.

The intermediate application program 200 can also obtain the running state of the game A1 through the game application programming interface A11 of the game A1 to confirm whether or not the game A1 is currently starting a new game round or ending the game round. When the intermediate application program 200 confirms that the game A1 is starting a new game round, the intermediate application program 200 will transmit the round start signal A3 to the mouse 100. When the intermediate application program 200 confirms that the game A1 ends the game round, the intermediate application program 200 will transmit the round end signal A4 to the mouse 100.

That is, the intermediate application program 200 is used as a tool for communication between the electronic device A and the mouse 100. The mouse 100 can obtain relevant information regarding the electronic device A and the game A1 from the system application programming interface A71 and the game application programming interface A11 of the electronic device A through the intermediate application program 200.

As described above, after the user connects the mouse 100 to the electronic device A, the user can find the intermediate program installation file 213 in the solid-state disk 2. Further, the user can use the intermediate program installation file 213 to install the intermediate application program 200 in the electronic device A, so that the mouse 100 can obtain a relevant running state of the electronic device A and relevant data of the game A1 that is currently running on the electronic device A.

It is worth mentioning that, in one specific embodiment of the present disclosure, the intermediate application program 200 can further obtain the screen information A6 corresponding to the screen connected to the electronic device A through the system application programming interface A71, and the intermediate application program 200 can transmit the screen information A6 to the mouse 100.

In another specific embodiment of the present disclosure, the solid-state disk 2 of the mouse 100 can be, for example, readable only by the intermediate application program 200. When the electronic device A does not have the intermediate application program 200 installed therein, the user cannot read the solid-state disk 2 in the mouse 100.

Figure 4:
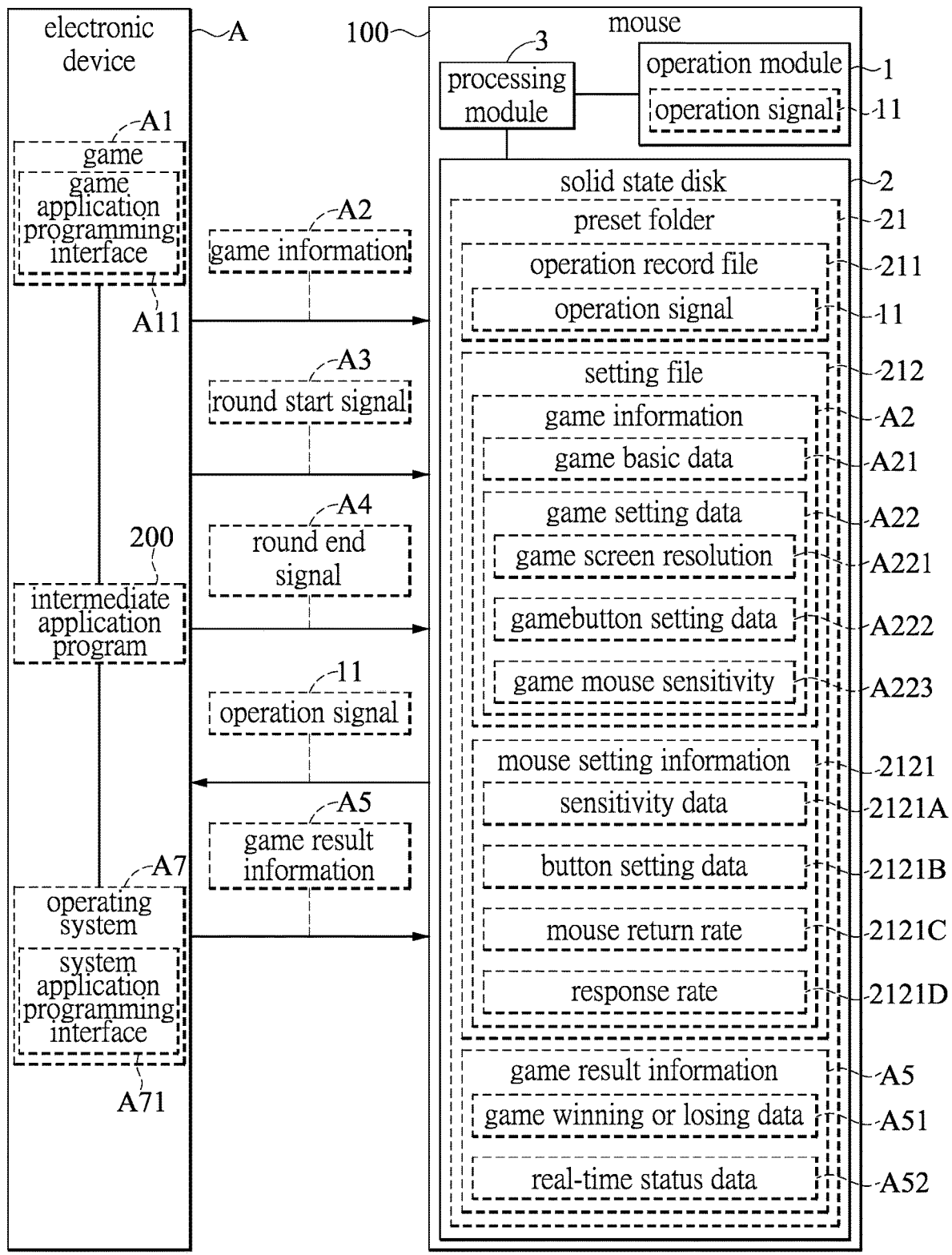
FIG. 4 is a functional block diagram of a gaming system according to the first embodiment of the present disclosure.

Reference is made to FIG. 4, which is a functional block diagram of a gaming system according to the first embodiment of the present disclosure. The gaming system of the present disclosure includes a mouse 100, and an intermediate application program 200. The mouse 100 includes an operation module 1, a solid-state disk 2, and a processing module 3. The operation module 1 is used for generating a corresponding operation signal 11 according to an operation of the mouse 100 by a user. The processing module 3 is electrically connected to the operation module 1 and the solid-state disk 2. The processing module 3 can be connected to an electronic device A in a wired or wireless manner. The features of the operation module 1, the solid-state disk 2, and the electronic device A can be referred to in the detailed descriptions of the foregoing embodiments, which will not be repeated herein.

The intermediate application program 200 is run in an operating system A7 of the electronic device A. The intermediate application program 200 can obtain a running state of the operating system A7 through a system application programming interface A71 of the operating system A7 to confirm whether the operating system A7 is currently running a game A1. When the intermediate application program 200 confirms that the operating system A7 is currently running the game A1, the intermediate application program 200 obtains a game information A2 from a game application programming interface A11 of the game A1, and transmits the game information A2 to the mouse 100.

The intermediate application program 200 can further obtain a running state of the game A1 through the game application programming interface A11 of the game A1 to confirm whether the game A1 is currently starting a new game round or ending a game round. When the intermediate application program 200 confirms that the game A1 is starting a new game round, the intermediate application program 200 will transmit a round start signal A3 to the mouse 100.

When the processing module 3 receives the round start signal A3, the processing module 3 not only transmits the operation signal 11 generated by the operation module 1 in real time to the electronic device A, but also synchronously records the operation signal 11 in an operation record file 211 in a preset folder 21 of the solid-state disk 2. The detailed description of the preset folder 21 and the operation record file 211 can be referred to in the above-mentioned embodiments.

When the intermediate application program 200 confirms that the game round of the game A1 ends through the game application programming interface A11 of the game A1, the intermediate application program 200 transmits a round end signal A4 and a game result information A5 to the mouse 100. The detailed description of the game result information A5 can be referred to in the foregoing embodiments. When the processing module 3 receives the round end signal A4, the processing module 3 stops recording the operation signal 11 generated by the operation module 1 in the operation record file 211, and the processing module 3 stores the game result information A5 in the preset folder 21.

In practical applications, the intermediate application program 200 can include a setting interface, and the user can select a setting file 212 in one of the preset folders 21 in the solid-state disk 2 of the mouse 100 by operating the setting interface, so that the intermediate application program 200 can perform corresponding settings for the game A1 and the mouse 100 according to the setting file 212. Alternatively, when the user selects one of the setting files 212 through the setting interface, the setting interface can present a setting screen, and the setting screen displays all setting data corresponding to the setting file 212.

In addition, the intermediate application program 200 can further include a history record interface. The user can select the operation record file 211 in one of the preset folders 21 in the solid-state disk 2 of the mouse 100 by operating the history record interface, so that the intermediate application program 200 can load the operation record file 211 into the game A1, and the game A1 can present a corresponding game screen or game video according to the operation record file 211.

Accordingly, through the design of the mouse 100 and the intermediate application program 200, the gaming system of the present disclosure enables the mouse 100 to automatically store the relevant setting data of the computer, the game, and the mouse in the solid-state disk of the mouse 100 when the user uses the mouse 100 to play games. Then, when the user arrives at a different venue to play the same game, the user only needs to install the intermediate application program 200 on the computer connected to the mouse 100, so as to quickly complete the relevant settings of the game, and the screen and the mouse connected to the computer.

Figure 5:
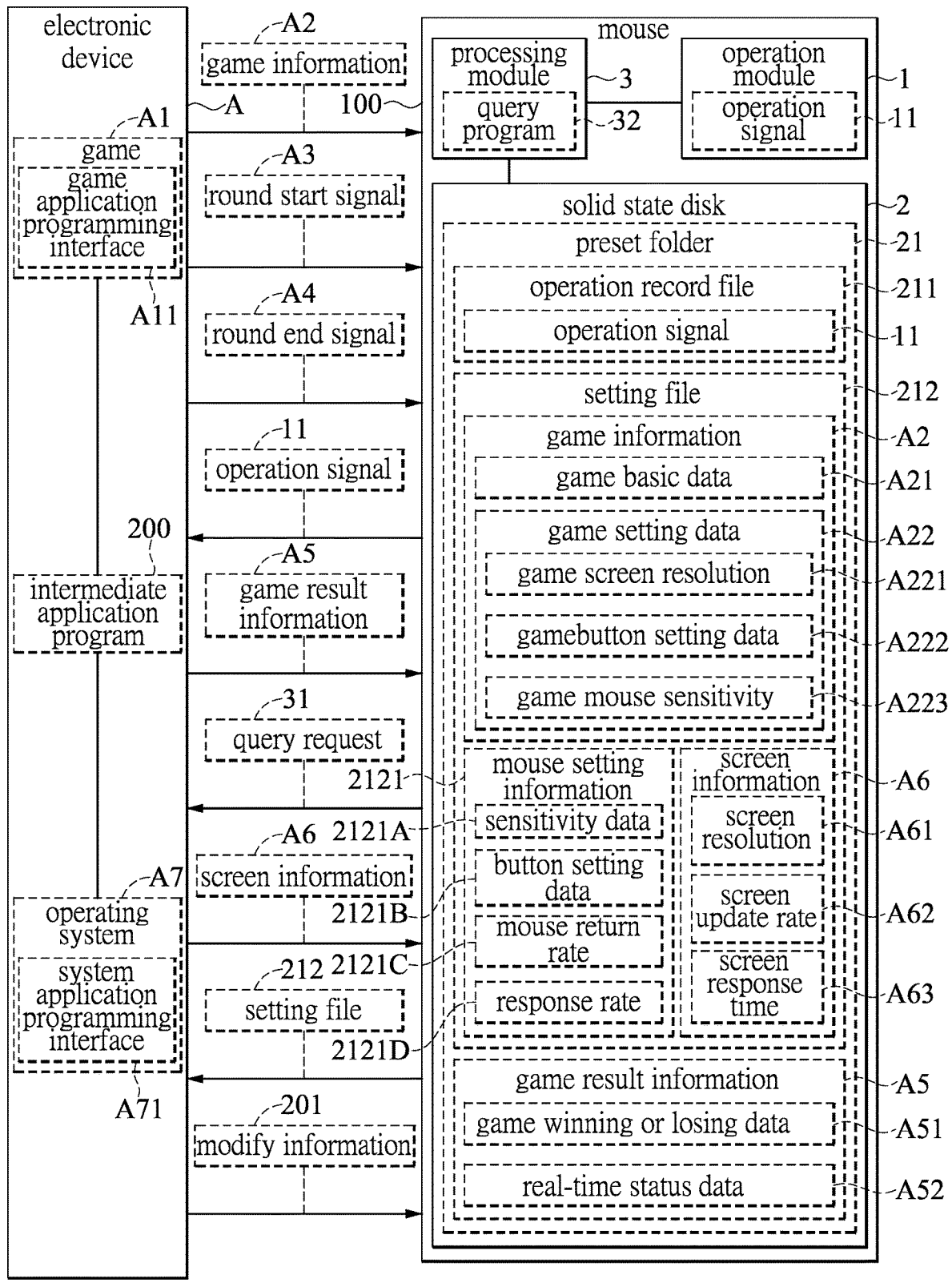
FIG. 5 is a functional block diagram of a gaming system according to the second embodiment of the present disclosure.

Reference is made to FIG. 5, which is a functional block diagram of a gaming system according to the second embodiment of the present disclosure. One of the differences between the gaming system of the second embodiment (FIG. 5) and the gaming system of the first embodiment (FIG. 4) is that, after the processing module 3 receives the game information A2, the processing module 3 can execute a query program 32, and query whether or not a setting file 212 including the same game basic data A21 is present in the solid-state disk 2 according to the game basic data A21. If the processing module 3 finds the corresponding setting file 212 in the solid-state disk 2, the processing module 3 will transmit the corresponding setting file 212 to the electronic device A.

After the intermediate application program 200 receives the setting file 212, the intermediate application program 200 will further ask the user whether to set the game A1 and the mouse 100 according to the setting file 212. If the user agrees to set the game A1 and the mouse 100 according to the setting file 212 through the intermediate application program 200, the intermediate application program 200 will set the game A1 through the game application programming interface A11 according to the game setting database A22 in the setting file 212. Further, the intermediate application program 200 will return a modify information 201 to the processing module 3. After the processing module 3 receives the modify information 201, the processing module 3 will set the mouse 100 according to the mouse setting information 2121 in the found setting file 212. On the contrary, if the user does not agree to set the game A1 and the mouse 100 according to the setting file 212 through the intermediate application program 200, the intermediate application program 200 will not set the game A1 and the mouse 100.

When the user agrees to set the game A1 and the mouse 100 according to the setting file 212 through the intermediate application program 200, the modify information 201 transmitted by the intermediate application program 200 to the processing module 3 can include the mouse setting information 2121 in the setting file 212 previously received by the intermediate application program 200. Then, when the processing module 3 receives the modify information 201, the processing module 3 can directly use the mouse setting information 2121 in the modify information 201 to set the mouse 100.

For example, if an e-sports player has used the same mouse 100 to play the same game A1, and after the e-sports player arrives at a gaming venue and connects the mouse 100 to a computer running the intermediate application program 200, the intermediate application program 200 will pop up an inquiry window showing a string of text such as "do you want to use the setting file stored in the mouse to set the game and the mouse?". If the e-sports player selects a "Yes" option in the inquiry window, the intermediate application program 200 then correspondingly sets the game A1 and the mouse 100 according to the setting file 212 in the mouse 100, so that the e-sports player can quickly and easily complete the relevant settings of the game and the mouse.

Another difference between the second embodiment and the first embodiment is that, the intermediate application program 200 can further obtain a screen information A6 through the system application programming interface A71. When the intermediate application program 200 transmits the game information A2 to the processing module 3, the intermediate application program 200 further transmits the screen information A6 to the processing module 3, and the processing module 3 will store the screen information A6 in the preset folder 21. The detailed description of the screen information A6 can be referred to in the aforementioned embodiments.

In the embodiment that the intermediate application program 200 further transmits the screen information A6 to the processing module 3, after the processing module 3 executes the query program 32, if the processing module 3 finds the corresponding setting file 212 in the solid-state disk 2, and the user agrees to set the game A1 and the mouse 100 according to the setting file 212 through the intermediate application program 200, the intermediate application program 200 sets the game A1 and the mouse 100 respectively according to the game setting database A22 and the mouse setting information 2121 in the setting file 212. Furthermore, the intermediate application program 200 sets the screen to which the electronic device A is connected according to the screen information A6 in the setting file 212.

For example, if an e-sports player has used the same mouse 100 to play the same game A1, and after the e-sports player arrives at a gaming venue and connects the mouse 100 to a computer running the intermediate application program 200, the intermediate application program 200 will pop up an inquiry window showing a string of text such as "do you want to use the setting file stored in the mouse to set the game, the screen, and the mouse?". If the e-sports player selects a "Yes" option in the inquiry window, the intermediate application program 200 then sets the game A1, and the screen and the mouse 100 connected to the electronic device A, according to the setting file 212 in the mouse 100, so that the e-sports player can quickly and easily complete the relevant settings of the game, the screen, and the mouse.

It is worth mentioning that, in one embodiment of the present disclosure, the intermediate application program 200 can include a setting interface, the setting interface can include an auto-loading option, and a user can choose to turn on or turn off the auto-loading option. If the user chooses to turn on the auto-loading option, and if the intermediate application program 200 receives the setting file 212 transmitted by the processing module 3 after the processing module 3 executes the query program 32, the intermediate application program 200 will directly set the game A1 according to the setting file 212 through the game application programming interface A11, and set the screen connected to the electronic device A through the system application programming interface A71. In addition, the intermediate application program 200 will automatically transmit the modify information 201 to the mouse 100 so that the mouse 100 can be directly set according to the setting file 212.

In other words, if the user has used the mouse 100 to play a game G, and if the electronic device A is currently running the game G, after the user opens the intermediate application program 200 and under the condition of the auto-loading option of the intermediate application program 200 being turned on, the intermediate application program 200 automatically set the game G, and the screen and the mouse 100 connected to the electronic device A according to the relevant setting file 212 corresponding to the game G in the solid-state disk 2 of the mouse 100.

As described above, by virtue of the mouse including the processing module and the solid-state disk, in the present disclosure, the mouse is enabled to record the setting data in the game, the setting data for the screen, and the setting data for the mouse when the user uses the mouse to play the game. In this way, when the user uses different electronic devices and the same mouse to play the game, the user can directly read the relevant setting file that corresponds to the current game and is stored in the solid-state disk of the mouse through the intermediate application program. Accordingly, the user can quickly set the electronic device, and the screen and the mouse connected to the electronic device.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching. The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A mouse, comprising:
    an operation module configured to generate an operation signal corresponding to an operation of the mouse by a user;
    a solid-state disk; and
    a processing module electrically connected to the operation module and the solid-state disk; wherein the processing module is capable of being connected to an electronic device in a wired or a wireless manner, and data in the solid-state disk is able to be accessed by the electronic device;
    wherein, when the electronic device that is connected to the processing module runs a game, the processing module receives game information, a round start signal, and a round end signal that are transmitted by the electronic device;
    wherein, when the processing module receives the game information and the round start signal in succession, the processing module transmits the operation signal generated by the operation module in real time to the electronic device, and the processing module synchronously records the operation signal in an operation record file in a preset folder of the solid-state disk;
    wherein, when the processing module receives the round end signal, the processing module stops recording the operation signal generated by the operation module in the operation record file;
    wherein the processing module further stores a setting file in the preset folder, and the setting file includes the game information and a mouse setting information; wherein the game information includes a game basic data, and a game setting database; wherein the game setting database includes at least one of a game screen resolution, a game button setting data, and a game mouse sensitivity; wherein the mouse setting information includes at least one of a sensitivity data, a button setting data, a mouse return rate, and a response rate at a time when the round start signal is received by the mouse;

wherein, after the processing module receives the round end signal, the processing module further stores a game result information transmitted by the electronic device in the preset folder; wherein the game result information includes a game winning or losing data, and multiple pieces of real-time status data; wherein the multiple pieces of real-time status data record results of the game that are correspondingly generated according to multiple ones of the operation signal.

2. The mouse according to claim 1, wherein, after the processing module receives the game information, the processing module sends a query request to the electronic device to obtain a screen information from the electronic device; wherein the screen information includes at least one of a screen resolution, a screen refresh rate, and a screen response time; wherein the processing module further stores the screen information in the setting file.

3. The mouse according to claim 1, wherein, after the processing module receives the game information, the processing module executes a query program and queries whether or not a same game basic data is present in the solid-state disk according to the game information that is received; wherein, if the processing module correspondingly finds the same game basic data in the solid-state disk, the processing module adjusts the mouse according to the mouse setting information stored in the preset folder that is found.

4. The mouse according to claim 1, wherein, after the processing module receives the game information, the processing module executes a query program and queries whether or not a same game basic data is present in the solid-state disk according to the game information that is received; wherein, if the processing module correspondingly finds the same game basic data in the solid-state disk, the processing module transmits the setting file stored in the preset folder to the electronic device.

5. The mouse according to claim 1, wherein the solid-state disk stores at least one intermediate program installation file, the processing module is capable of transmitting the intermediate program installation file to the electronic device, and an operating system of the electronic device is capable of using the intermediate program installation file to install an intermediate application program;

wherein the intermediate application program obtains a running state of the operating system through a system application programming interface of the operating system to confirm whether or not the operating system is currently running the game; wherein, when the intermediate application program confirms that the operating system is currently running the game, the intermediate application program obtains the game information from a game application programming interface of the game and transmits the game information to the processing module of the mouse;

wherein the intermediate application program obtains the running state of the game through the game application programming interface to confirm whether or not the game is currently starting a new game round, ending a game round, or has not started a game round; wherein, when the intermediate application program confirms that the game is starting the new game round, the intermediate application program transmits the round start signal to the mouse; wherein, when the intermediate application program confirms that the game is ending the game round, the intermediate application program transmits the round end signal to the mouse.

6. The mouse according to claim 5, wherein, when the intermediate application program transmits the game information to the processing module, the intermediate application program further obtains a screen information through the system application programming interface, and the intermediate application program further transmits the screen information to the processing module; wherein, after receiving the screen information, the processing module stores the screen information in the preset folder; wherein the screen information includes at least one of a screen resolution, a screen refresh rate, and a screen response time.

7. A gaming system, comprising:
a mouse including:
an operation module configured to generate an operation signal corresponding to an operation of the mouse by a user;
a solid-state disk; and
a processing module electrically connected to the operation module and the solid-state disk; wherein the processing module is capable of being connected to an electronic device in a wired or a wireless manner; and
an intermediate application program capable of running on an operating system of the electronic device;
wherein the intermediate application program is capable of obtaining a running state of the operating system through a system application programming interface of the operating system to confirm whether or not the operating system is currently running a game; wherein, when the intermediate application program confirms that the operating system is currently running the game, the intermediate application program obtains a game information from a game application programming interface of the game and transmits the game information to the processing module of the mouse;
wherein the intermediate application program obtains the running state of the game through the game application programming interface to confirm whether or not the game is currently starting a new game round, ending a game round, or has not started a game round; when the intermediate application program confirms that the game is starting the new game round, the intermediate application program transmits a round start signal to the mouse;
wherein, when the processing module receives the round start signal, the processing module transmits the operation signal generated by the operation module in real time to the electronic device, and the processing module synchronously records the operation signal in an operation record file in a preset folder of the solid-state disk;
wherein the processing module further stores a setting file in the preset folder, and the setting file includes the game information and a mouse setting information; wherein the game information includes a game basic data, and a game setting database; the game setting database includes at least one of a game screen resolution, a game button setting data, and a game mouse sensitivity; wherein the mouse setting information includes at least one of a sensitivity data, a button setting data, a mouse return rate, and a response rate at a time when the mouse receives the round start signal;

wherein, when the intermediate application program confirms that the game is ending the game round through the game application programming interface, the intermediate application program transmits a round end signal and a game result information to the mouse; wherein, when the processing module receives the round end signal, the processing module stops recording the operation signal generated by the operation module in the operation record file, and the processing module further stores the game result information in the preset folder; wherein the game result information includes a game winning or losing data, and multiple pieces of real-time status data; wherein the multiple pieces of real-time status data record results of the game that are correspondingly generated according to multiple ones of the operation signal.

8. The gaming system according to claim 7, wherein, after the processing module receives the game information, the processing module executes a query program, and queries whether or not the setting file including a same game basic data is present in the solid-state disk according to the game basic data;
wherein, if the processing module correspondingly finds the setting file in the solid-state disk, the processing module transmits the setting file to the electronic device; wherein, after the intermediate application program receives the setting file, the intermediate application program inquires the user whether or not to set the game and the mouse according to the setting file;
wherein, if the user agrees to set the game and the mouse according to the setting file through the intermediate application program, the intermediate application program sets the game according to the game setting database in the setting file through the game application programming interface, and the intermediate application program returns a modify information to the processing module; wherein, after the processing module receives the modify information, the processing module sets the mouse according to the mouse setting information in the setting file that is found.

9. The gaming system according to claim 7, wherein, when the intermediate application program transmits the game information to the processing module, the intermediate application program further obtains a screen information through the system application programming interface, and the intermediate application program further transmits the screen information to the processing module; wherein, after receiving the screen information, the processing module stores the screen information in the preset folder; wherein the screen information includes at least one of a screen resolution, a screen refresh rate, and a screen response time.

10. The gaming system according to claim 9, wherein, after the processing module receives the game information, the processing module executes a query program, and queries whether or not the setting file that includes a same game basic data is present in the solid-state disk according to the game basic data;
wherein, if the processing module correspondingly finds the setting file in the solid-state disk, the processing module transmits the setting file to the electronic device; wherein, after the intermediate application program receives the setting file, the intermediate application program inquires the user whether or not to set the game and the mouse according to the setting file;
wherein, if the user agrees to set the game and the mouse according to the setting file through the intermediate application program, the intermediate application program sets the game according to the game setting database in the setting file, the intermediate application program also sets the screen according to the screen information in the setting file, and the intermediate application program further returns a modify information to the processing module;
wherein, after the processing module receives the modify information, the processing module sets the mouse according to the mouse setting information in the setting file that is found.

11. The gaming system according to claim 7, wherein, after the processing module receives the game information, the processing module executes a query program, and queries whether or not the setting file that includes a same game basic data is present in the solid-state disk according to the game basic data;
wherein, if the processing module correspondingly finds the setting file in the solid-state disk, the processing module transmits the setting file to the electronic device;
wherein, when the electronic device receives the setting file, the intermediate application program sets the game according to the game setting database in the setting file through the game application programming interface; wherein the intermediate application program further returns a modify information to the processing module;
wherein, after the processing module receives the modify information, the processing module sets the mouse according to the mouse setting information in the setting file that is found.

* * * * *